US006493017B1

(12) United States Patent
Huang

(10) Patent No.: US 6,493,017 B1
(45) Date of Patent: Dec. 10, 2002

(54) COLOR PRINTER WITH SENSORS ARRANGED ALONG A LENGTH OF A RIBBON FOR DETECTING THE RIBBON'S POSITION

(75) Inventor: Kuan-Chih Huang, Taipei Hsien (TW)

(73) Assignee: Hi-Touch Imaging Technologies Co., Ltd., Pan-Chiao (TW)

( * ) Notice: Subject to any disclaimer, the term of this patent is extended or adjusted under 35 U.S.C. 154(b) by 0 days.

(21) Appl. No.: 09/683,960

(22) Filed: Mar. 6, 2002

(30) Foreign Application Priority Data

Aug. 16, 2001 (TW) ....................................... 90120144 A

(51) Int. Cl.[7] .............................. B41J 35/18; G01J 3/50

(52) U.S. Cl. ....................................................... 347/178

(58) Field of Search ................................. 347/177, 178; 250/559.01, 559.03

(56) References Cited

U.S. PATENT DOCUMENTS

| | | | | |
|---|---|---|---|---|
| 4,710,781 A | * | 12/1987 | Stephenson | 347/178 |
| RE33,260 E | * | 7/1990 | Stephenson | 347/178 |
| 5,751,601 A | * | 5/1998 | Tang et al. | 347/177 |
| 6,071,024 A | * | 6/2000 | Chi-Ming et al. | 347/177 |
| 6,080,993 A | * | 6/2000 | Zwijsen | 250/548 |
| 6,396,526 B1 | * | 5/2002 | Sung et al. | 347/178 |

FOREIGN PATENT DOCUMENTS

| | | | | |
|---|---|---|---|---|
| JP | 11-180016 | * | 7/1999 | G01J/3/50 |

* cited by examiner

*Primary Examiner*—Huan Tran
(74) *Attorney, Agent, or Firm*—Winston Hsu

(57) ABSTRACT

A color printer includes an ink ribbon having a plurality of sequentially arranged dye regions, each of the dye regions having a plurality of dye frames for carrying dye of different colors, a ribbon driving device for causing the ink ribbon to move in a predetermined direction, a controller for controlling the color printer, and a plurality of optical detecting devices sequentially arranged and mounted adjacent to the ink ribbon. At least two output signals are detected when each of the optical detecting devices senses a dye frame, and each the output signal is defined as a phase. Position of the ink ribbon is discerned by the controller according to the phase and phase-to-phase variation recorded by the optical detecting devices when the controller commands the ribbon driving device to move the ink ribbon.

12 Claims, 13 Drawing Sheets

| Dye frame color | Yellow | Magenta | Cyan | Over coating | Opaque | Transparent |
|---|---|---|---|---|---|---|
| Phase | High | Low | Low | High | Low | High |
| Phase | 1 | 0 | 0 | 1 | 0 | 1 |

Fig. 5

| Dye frame color | Yellow | Magenta | Cyan | Over coating | Opaque | Transparent |
|---|---|---|---|---|---|---|
| Phase | High | High | Low | High | Low | High |
| Phase | 1 | 1 | 0 | 1 | 0 | 1 |

Fig. 6

| Phase | 11 | 10 | 01 | 00 |
|---|---|---|---|---|
| Conversion code | 3 | 2 | 1 | 0 |

Fig. 7

| State | S1 | S2 | S3 | S4 | S5 | S6 | S7 | S8 | S9 | S10 | S11 | S12 |
|---|---|---|---|---|---|---|---|---|---|---|---|---|
| Phase | 11 | 01 | 11 | 10 | 11 | 01 | 00 | 10 | 00 | 01 | 00 | 10 |
| Conversion code | 3 | 1 | 3 | 2 | 3 | 1 | 0 | 2 | 0 | 1 | 0 | 2 |

Fig. 9B

| State | S1 | S2 | S3 | S4 | S5 | S6 | S7 | S8 |
|---|---|---|---|---|---|---|---|---|
| Phase | 11 | 01 | 00 | 10 | 11 | 10 | 00 | 10 |
| Conversion code | 3 | 1 | 0 | 2 | 3 | 2 | 0 | 2 |

Fig. 11B

COLOR PRINTER WITH SENSORS ARRANGED ALONG A LENGTH OF A RIBBON FOR DETECTING THE RIBBON'S POSITION

BACKGROUND OF INVENTION

1. Field of the Invention

The present invention relates to a photo printer, and more particularly, to a photo printer with sensors arranged along a length of a ribbon for detecting the ribbons position.

2. Description of the Prior Art

Please refer to FIG. 1 and FIG. 2. FIG. 1 is a perspective view of a conventional ink ribbon positioning system 10. FIG. 2 is a block diagram of a conventional color printer 50. FIG. 1 and FIG. 2 show the Taiwan Patent No. 399016 "INK RIBBON POSITIONING SYSTEM OF A COLOR PRINTER". The ink ribbon positioning system 10 is used for identifying the position of a color ink ribbon 12 of the color printer 50. The ink ribbon 12 is installed inside a ribbon cartridge (not shown) in a windable manner, and comprises a plurality of sequentially arranged dye regions 14. Each of the dye regions 14 comprises four dye frames 16, 18, 20, 22 for separatelycarrying yellow, magenta, cyan, and over coating dye. The ink ribbon 12 also comprises opaque regions 24 installed at the front and rear ends of the dye regions 14.

The ink ribbon positioning system 10 comprises a light source 32 installed at one side of the ink ribbon 12 for emitting a light beam 34 of a predetermined color toward the ink ribbon 12 and an optical sensor 36 installed at the opposite side of the ink ribbon 12 fordetecting the light beam 34 passed through the ink ribbon 12 and generating a corresponding output voltage. The ink ribbon positioning system 10 also comprises an identification device 38 for identifying positions of the dye region 14 of the ink ribbon 12 and the dye frames 16, 18, 20, 22 inside the dye region 14 according to the output voltages generated by the optical sensor 36 and generating corresponding position signals. The light beam 34 emitted by the light source 32 has different penetration rates for each of the four dye frames 16, 18, 20, 22 inside the dye region 14 and for the opaque region 24. Therefore, when two adjacent dye frames pass by the optical sensor 36 sequentially, the optical sensor 36 will generate different output voltages.

The color printer 50 comprises a winding mechanism 52 for winding the ink ribbon 12 inside the ribbon cartridge so that each of the dye frames 16, 18, 20, 22 inside the dye region 14 pass by a thermal print head 54 sequentially, the thermal print head 54 for transferring the different colors of dye on the dye frames 16, 18, 20, 22 onto a photo paper (not shown) sequentially, and a control circuit 40 for controlling operations of the winding mechanism 52 and the thermal print head 54 according to the position signals generated by the identification device 38 so as to form a desired pattern.

Because the light beam 34 emitted by the light source 32 has different penetration rates for each of the dye frames 16, 18, 20, 22 and the opaque region 24, as two adjacent dye frames pass by the optical sensor 36 in sequence, the optical sensor 36 will generate different output voltages. The identification device 38 will identify the positions of the dye region 14 and the dye frames 16, 18, 20, 22 inside the dye region 14 according to the corresponding output voltages generated by the optical sensor 36, and will generate corresponding position signals. The control circuit 40 will control the winding mechanism 52 to wind the ink ribbon 12 according to the position signals generated by the identification device 38 so as to pass the ink ribbon 12 by the thermal print head 54 for sequentially transferring dyes onto the photo paper.

The identification device 38 differentiates the positions of each of the four frames 16, 18, 20, 22 inside the dye region 14 according to the light beam having different penetration rates for each frame. The identification device 38 comprises three comparators 42, 44, 46 with reference voltages between the four dye frames 16, 18, 20, 22 and the opaque region 24 so as to discern the four distinct output voltages and generate corresponding position signals for identifying the positions of the dye frames 16, 18, 20, 22 inside the dye region 14 of the ink ribbon 12. However, the yellow dye frame 16 and the over coating dye frame 22 will generate the same output voltage, so the identification device 38 has to discern orders of the other dye frames (the magenta dye frame 18 and the cyan dye frame 20) first to differentiate the yellow dye frame 16 from the over coating dye frame 22. In addition, a particular barcode is printed at a front end of the yellow dye frame 16 and the over coating dye frame 22 respectively to distinguish the two. This causes the color printer 50 to need more time to identify the initial position of the ink ribbon 12 (the initial position of the yellow dye frame 16) when the color printer 50 prints at the initial position of the yellow dye frame 16. It also increases the amount of parts used, resulting in higher production costs.

SUMMARY OF INVENTION

It is therefore a primary objective of the present invention to provide a color printer with sensors arranged along a length of a ribbon for detecting the ribbons position to solve the above-mentioned problems.

In the claimed invention, the color printer comprises an ink ribbon capable of moving in a predetermined direction. The ink ribbon has a plurality of dye regions sequentially arranged in the predetermined direction on the ink ribbon. Each dye region includes a plurality of dye frames for carrying dye of different colors,a print head for transferring the dye of different colors stored in the dye frames onto an object to form a desired pattern,a ribbon driving device for causing the ribbon to move in the predetermined direction, a controller for controlling the color printer, and a plurality of optical detecting devices mounted adjacent to the ink ribbon and arranged sequentially along the predetermined direction. When each of the optical detecting devices senses a dye frame, at least two output signals are detected. Each output signal is defined as a phase. A position of the ink ribbon is discerned by the controller according to the phase and phase-to-phase variation recorded by the optical detecting devices when the controller commands the ribbon driving device to move the ink ribbon.

The ink ribbon positioning system in the present invention can search for an initial position of the dye frame of the ink ribbon according to the different phase-to-phase variations generated by the light sources and the photo sensors of the optical detecting devices without any identification devices, parts for measuring voltage variations, or particular barcodes to identify the ink ribbon, resulting in decreasing costs.

These and other objectives of the present invention will no doubt become obvious to those of ordinary skill in the art after reading the following detailed description of the preferred embodiment that is illustrated in the multiple figures and drawings.

BRIEF DESCRIPTION OF DRAWINGS

FIG. 5 is a table contrasting phases with each corresponding dye frame and dividing section when the optical detecting devices utilize green light sources.

FIG. 6 is a table contrasting phases with each corresponding dye frame and dividing section when the optical detecting devices utilize red light sources.

FIG. 7 is a table contrasting phases and conversion codes generated by the photo sensor.

FIG. 9B is a table contrasting the phase and conversion codes generated by the photo sensor shown in FIG. 9A.

FIG. 11B is a table contrasting the phase and conversion codes generated by the photo sensor shown in FIG. 11A.

DETAILED DESCRIPTION

Figure 1:
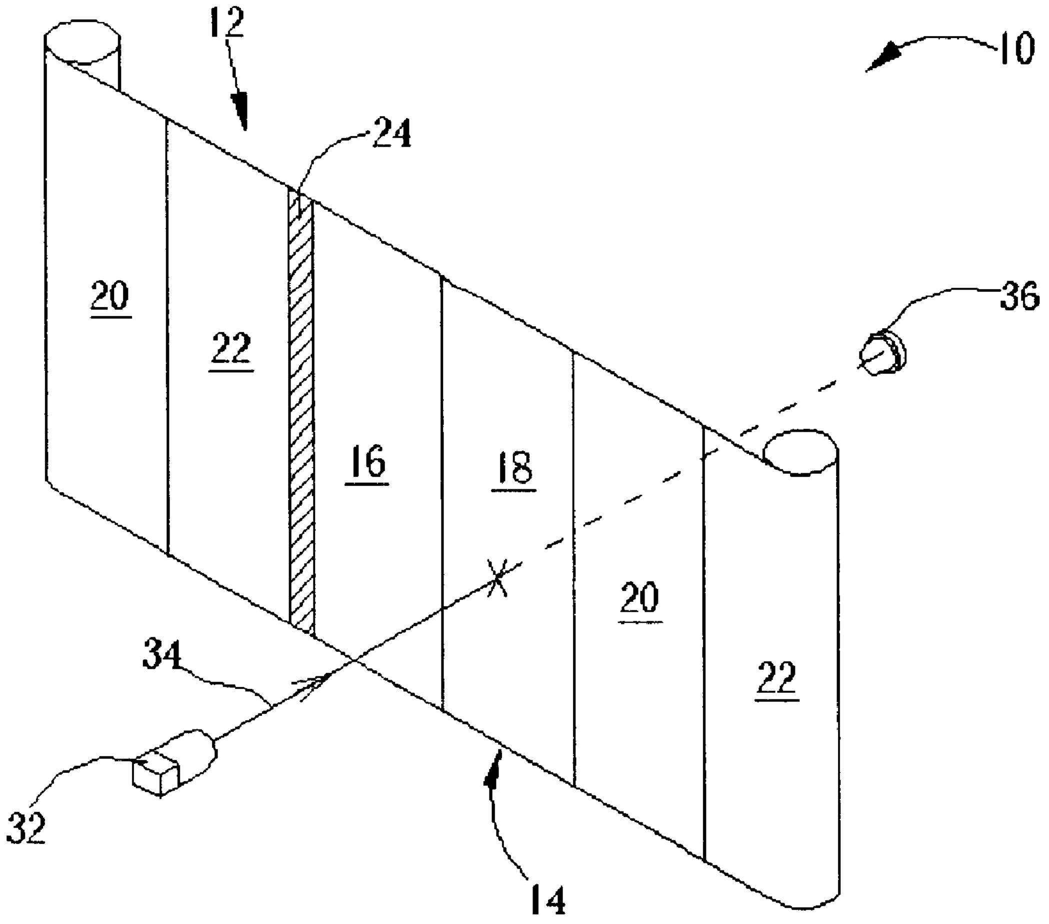
Fig. 1 Prior art
FIG. 1 is a perspective view of a conventional ink ribbon positioning system.
Figure 2:
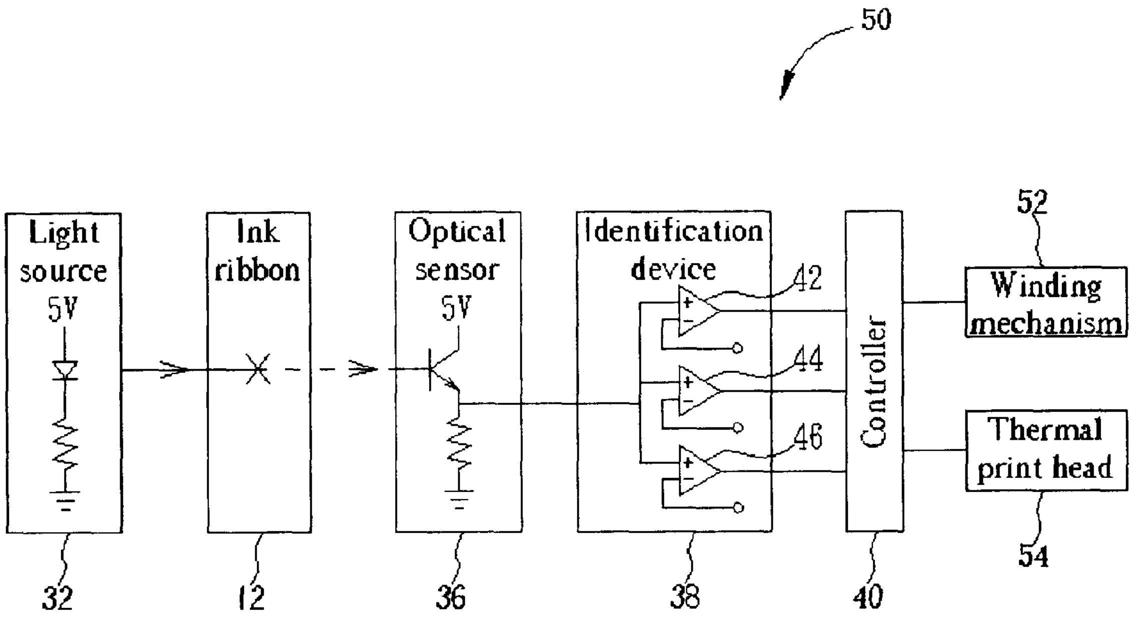
Fig. 2 Prior art
FIG. 2 is a block diagram of a conventional color printer.
Figure 3:
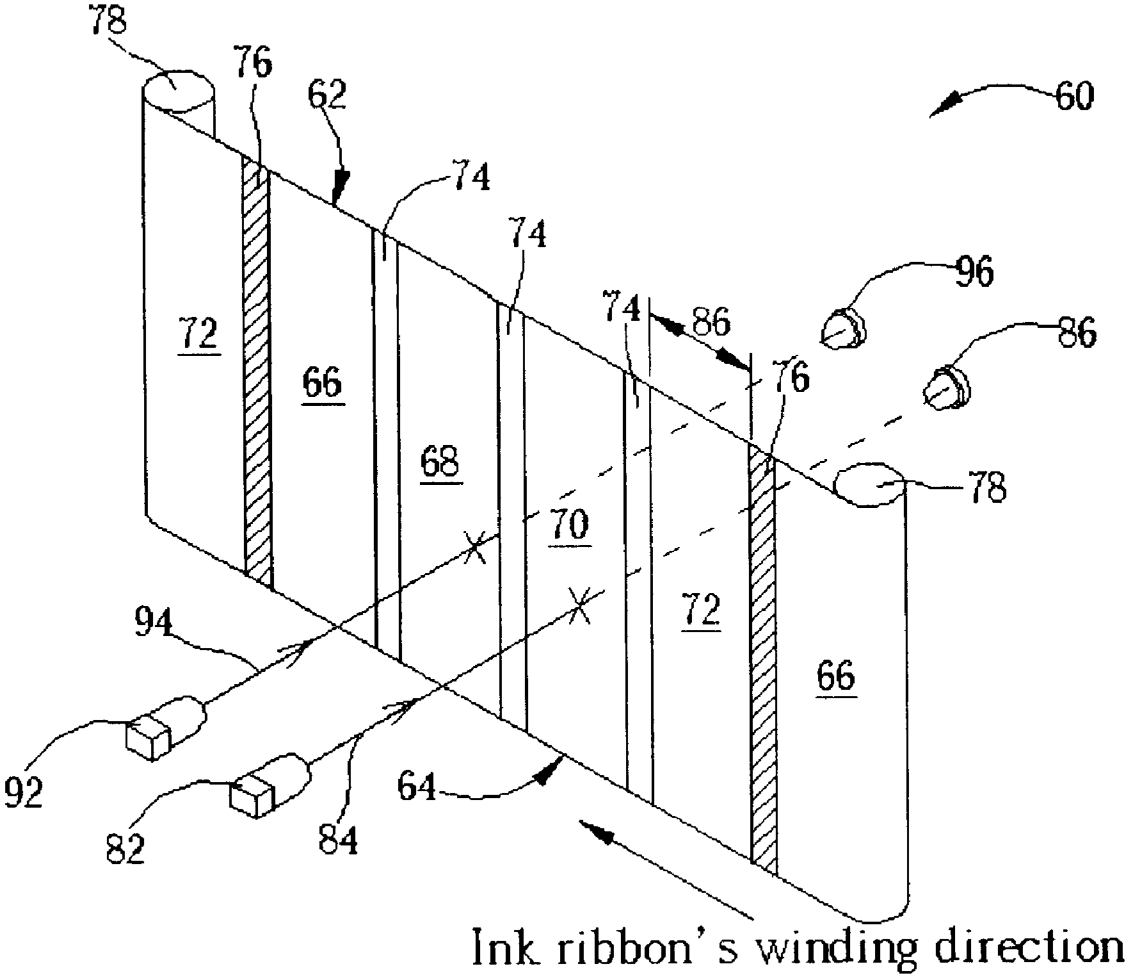
FIG. 3 is a perspective view of an ink ribbon positioning system of a color printer according to the present invention.
Figure 4:
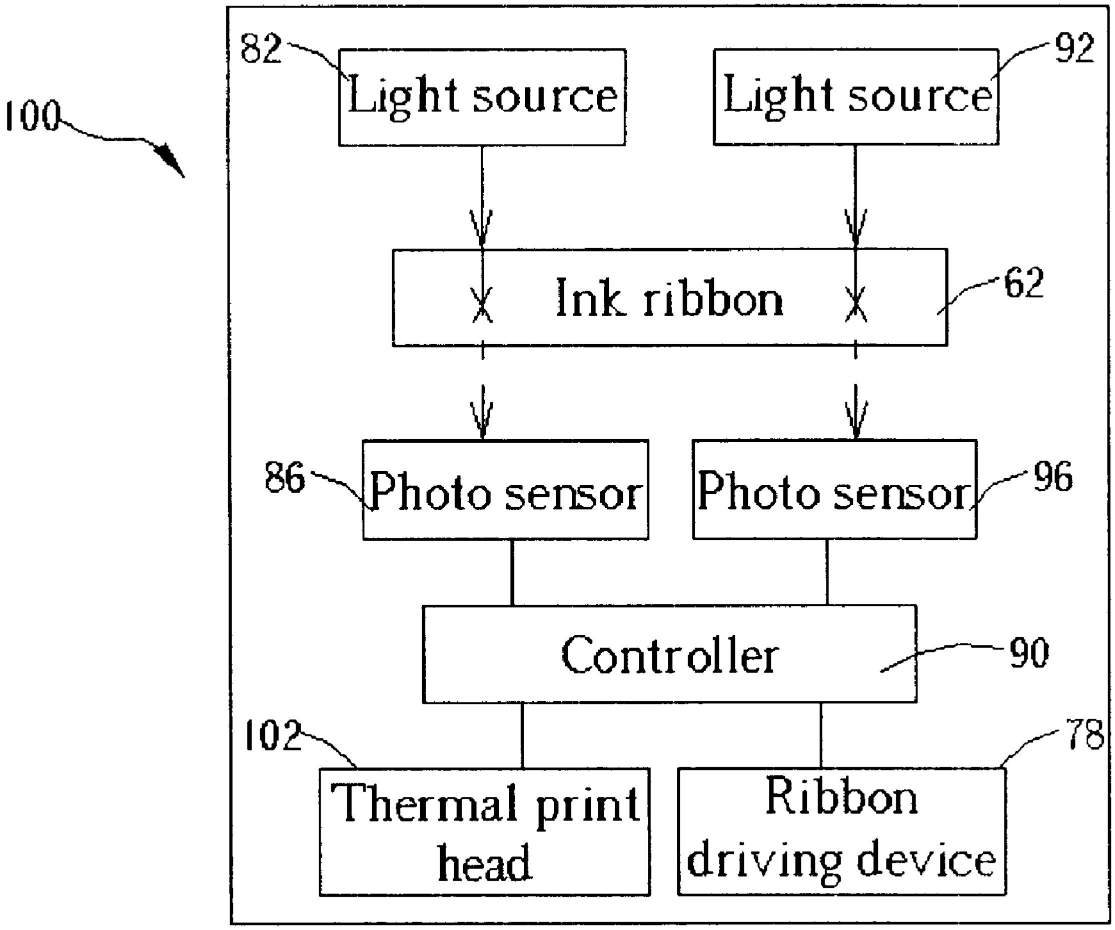
FIG. 4 is a block diagram of the color printer according to the present invention.

Please refer to FIG. 3 and FIG. 4. FIG. 3 is a perspective view of an ink ribbon positioning system 60 of a color printer 100 according to the present invention. FIG. 4 is a block diagram of the color printer 100 according to the present invention. The color printer 100 is a photo printer including the ink ribbon positioning system 60, an ink ribbon 62 capable of moving in a predetermined direction, a controller 90, a thermal print head 102, and a ribbon driving device 78. The ink ribbon positioning system 60 is used for identifying the position of the ink ribbon 62 of the color printer 100.The ink ribbon 62 is installed in a ribbon cartridge (not shown) and comprises a plurality of dye regions 64 sequentially arranged in the predetermined direction on the ink ribbon 62. Each of the dye regions 64 includes four dye frames 66, 68, 70, 72 for carrying dye ofyellow, magenta, cyan and over coating colors, respectively.

Adjacent to the yellow dye frame 66, the magenta dye frame 68, the cyan dye frame 70, and the over coating dye frame 72 are disposed, respectively,an opaque dividing section 76, a transparent dividing section 74, a transparent dividing section 74, and a transparent dividing section 74 that allows the controller 90 to discern an initial position of each of the four dye frames 66, 68, 70, 72. The controller 90 controls the color printer 100. The ribbon driving device 78 causes the ink ribbon 62 stored in the ribbon cartridge to roll in the predetermined direction. The thermal print head 102 transfers the dye of different colors stored in the dye frames 66, 68, 70, 72 onto a photo paper to form a desired pattern.

As shown in FIG. 3, the ink ribbon positioning system 60 comprises two optical detecting devices mounted adjacent to the ink ribbon 62 and arranged sequentially along the predetermined direction. The two optical detecting devices include a first light source 82 and a second light source 92 disposed at one side of the ink ribbon 62 for emitting a light beam of a predetermined color, and a first photo sensor 86 and a second photo sensor 96 disposed at the opposite side of the ink ribbon 62 for detecting transmitted light 84 and 94 which is emitted from the first light source 82 and the second light source 92 and penetrates the ink ribbon 62, thereby generating corresponding output signals. When the controller 90 causes the ribbon driving device 78 to roll the ink ribbon 62 stored in the ribbon cartridge so as each of the dye frames 66, 68, 70, 72 inside the dye region 64 pass by the thermal print head 102 sequentially, the first photo sensors 86 and the second photo sensor 96 sense the dye region 64 of the ink ribbon 62 thereby generating at least two different output signals. Each output signal is defined as a phase. Thereafter, when the controller 90 causes the ribbon driving device 78 to roll the ink ribbon 62 and then commands the thermal print head 102 to print the desired pattern, the position of the ink ribbon 62 is discerned by the controller 90 according to the phase and phase-to-phase variation recorded by the optical detecting devices.

The light beams 84 and 94 emitted by the first light source 82 and the second light source 92 have different penetration rates for each of the dye frames 66, 68, 70, 72, the opaque dividing section 76, and the transparent dividing section 74. As two adjacent dye frames pass by the first photo sensor 86 and the second photo sensor 96 sequentially, the first photo sensor 86 and the second photo sensor 96 generate different phases and phase-to-phase variations. After that, the position of the dye region 64 and the dye frames 66, 68, 70, 72 inside the dye region 64 are discerned according to the phases and the phase-to-phase variations, causing the first photo sensor 86 and the second photo sensor 96 to generate corresponding position signals. The controller 90 causes the ribbon driving device 78 to wind the ink ribbon 62 passing by the thermal print head 102, and then the thermal print head 102 transfers the dye of different colorsstored in the dye frames 66, 68, 70, 72 onto the photo paper sequentially.

As mentioned above, the present invention discerns the position of the dye region 64, and the dye frames 66, 68, 70, 72 inside the dye region 64 according to the phases and the phase-to phase variations between each of the dye regions 64 to identify the initial position of the ink ribbon 62.

Please refer to FIG. 5, FIG. 6, and FIG. 7. FIG. 5 is a table contrasting phases with each corresponding dye frame and dividing section when the optical detecting devices utilize green light sources. FIG. 6 is a table contrasting phases with each corresponding dye frame and dividing section when the optical detecting devices utilize red light sources. FIG. 7 is a table contrasting the phase and conversion codes generated by the photo sensor. As shown in FIG. 5 and FIG. 6, in the color printer 100 of the present invention, the light beam 84 (green) and the light beam 94 (red) emitted by the first light source 82 and the second light source 92 of the optical detecting device have different penetration rates for each of the dye regions 64 of the ink ribbon 62, each of the dye frames 66, 68, 70, 72, the opaque dividing section 76, and the transparent dividing section 74. As a result, the first photo sensor 86 and the second photo sensor 96 generate only two different output signals, namely a high phase and a low phase (represented by "1" and "0" respectively). As shown in FIG. 7, the phases of the dye frames 66, 68, 70, 72 and the dividing sections 74 and 76 generated by the two photo sensors 86 and 96 are converted to corresponding conversion codes. When two predetermined conversion codes are represented continuously, the initial position of the ink ribbon 62 is discerned (from the initial position of the yellow dye frame 66). The details are described as follows.

Figure 8:
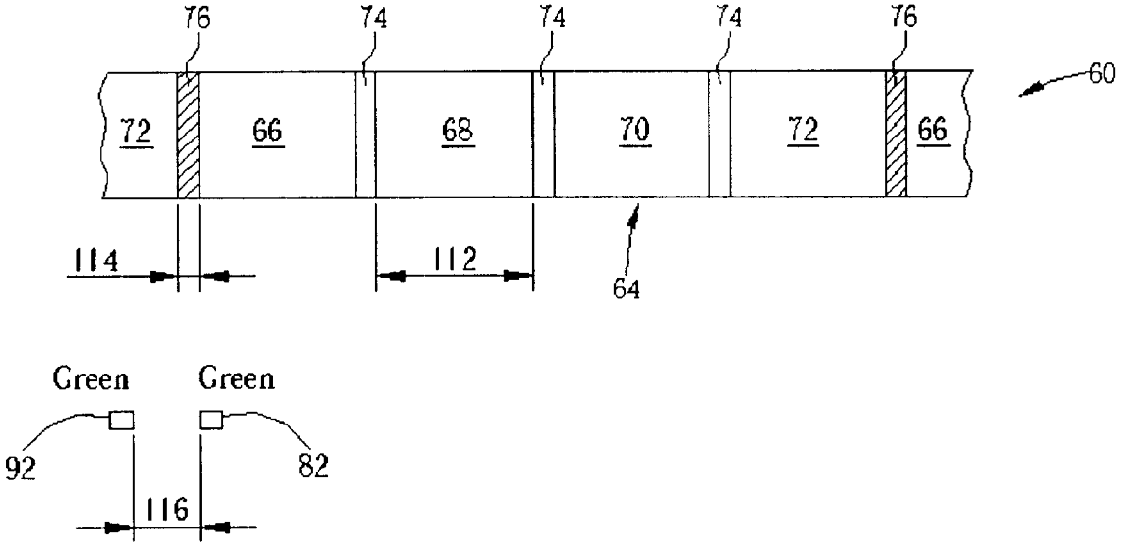
FIG. 8 is a perspective view of the ink ribbon positioning system of the color printer according to a first embodiment of the present invention.
Figure 9A:
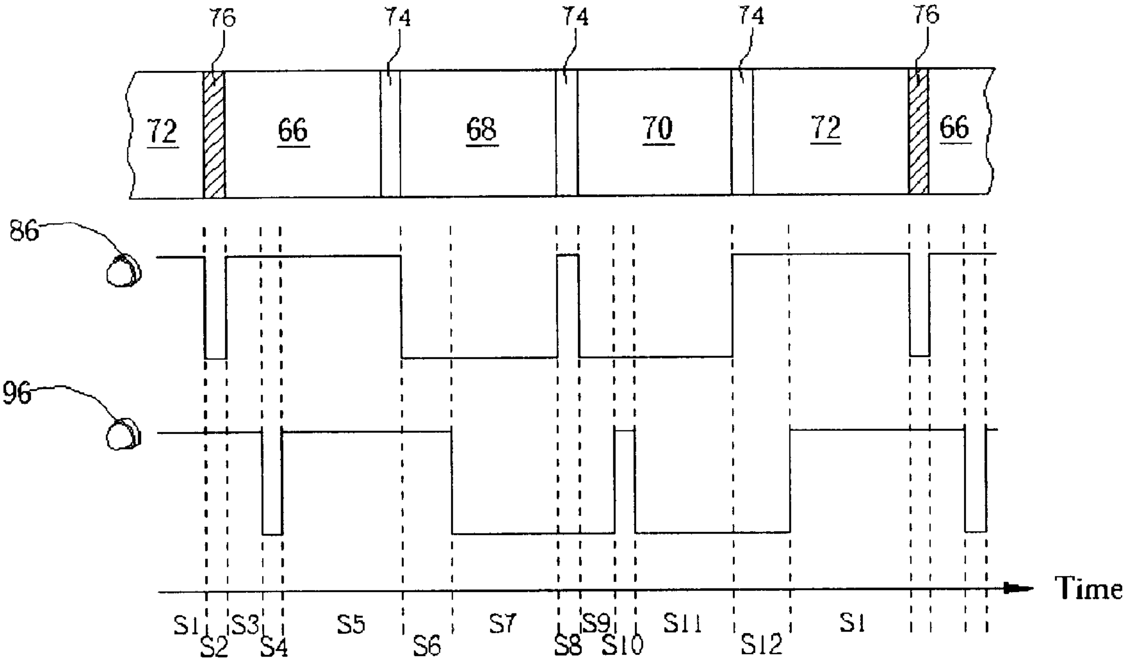
FIG. 9A is a time sequence diagram of phases generated by a photo sensor shown in FIG. 8.

Please refer to FIG. 8, FIG. 9A, and FIG. 9B. FIG. 8 is a perspective view of the ink ribbon positioning system 60 of the color printer 100 according to a first embodiment of the present invention. FIG. 9A is a time sequence diagram of the phase generated by the photo sensor shown in FIG. 8. FIG. 9B is a table contrasting the phase and the conversion code generated by the photo sensor shown in FIG. 9A. The ink ribbon 62 comprises theplurality of dye regions 64 sequentially arranged in the predetermined direction. Each of the dye regions 64 consists of the four dye frames 66, 68, 70, 72 for carrying dye of yellow, magenta, cyan, and over coating colors. Each of the dye frames 66, 68, 70, 72 has a substantially equal first length 112. The opaque dividing section 76 and the three transparent dividing sections 74 are positioned at the front end of each of the dye frames 66, 68, 70, 72, and allow the controller 90 to discern an initial position of each of the four dye frames 66, 68, 70, 72. Each dividing section has a substantially equal second length 114. The controller 90 controls the color printer 100, and the ribbon driving device 78 causes the ink ribbon 62 stored in the ribbon cartridge to roll in the predetermined direction. The thermal print head 102 transfers the dye of different colors stored in the dye frames 66, 68, 70, 72 onto a photo paper to form a desired pattern.

As shown in FIG. 8, the ink ribbon positioning system 60 comprises two optical detecting devices mounted adjacent to the ink ribbon 62 and arranged sequentially along the predetermined direction, with a distance of a third length 16 between the two optical detecting devices. The first length 112 is greater than the second length 114, and the third length 116 is greater than the second length 114.

As shown in FIG. 9A, when the controller 90 causes the ribbon driving device 78 to wind the ink ribbon 62 stored in the ink ribbon cartridge, causing the dye frames 66, 68, 70, 72 inside the dye region 64 to pass by the thermal print head 102 sequentially, the first photo sensor 86 and the second photo sensor 96 sense the dye region 64 of the ink ribbon 62, thereby generating two different phases. Therefore, twelve state-to state variations S1, S2, S3, S4, S5, S6, S7, S8, S9, S10, S11, S12 are generated along a time axis when the first photo sensor 86 and the second photo sensor 96 sense a dye frame of the dye region 64. The printing order of the ink ribbon 62 is the yellow dye frame 66, the magenta dye frame 68, the cyan dye frame 70, and the over coating dye frame 72. This means that the controller 90 will search for the yellow dye frame 66 first, then search for the magenta dye frame 68, the cyan dye frame 70, and the over coating frame 72 in sequence to identify the initial position of the ink ribbon 62. The details are described as follows (please refer to FIG. 5, FIG. 8, FIG. 9A and FIG. 9B): Step 130:Search for the yellow dye frame 66. Turn on the two green light sources 82, 92 and the two photo sensors 86, 96, and wind the ink ribbon 62; Step 132:Search for the phase "11", it could be S1, S3 or S5, and then wind the ink ribbon 62 continuously;Step 134:Search for the next state. If the phase is "01", it could be S2 or 56, and then perform step 136 and wind the ink ribbon 62 continuously. If the phase is "10", it is S4, go back and perform step 132.

Step 136:Search for next state. If the phase is "11", it is S3. Namely, the initial position of the yellow dye frame 66 is detected, and the color printer 100 can start to transfer the dye on the yellow dye frame 66 onto the photo paper. Thereafter perform step 138 and search for the magenta dye frame 68. If the phase is "00", it is S7, go back and perform step 132.

Step 138:Search for the magenta dye frame 68. Because printing of the dye on the yellow dye frame 66 onto the photo paper has just finished, the photo sensor 86 must still be within the yellow dye frame 66. Continuously wind the ink ribbon 62. When the phase generated by the photo sensor 86 goes from "1" to "0", the initial position of the magenta dye frame 68 is detected. Then, start to transfer the dye on the magenta dye frame 68 onto the photo paper. Thereafter perform step 140 to search for the cyan dye frame 70.

Step 140:Search for the cyan dye frame 70. Because printing of the dye on the magenta dye frame 68 onto the photo paper has just finished, the photo sensor 86 must still be within the magenta dye frame 64. Continuously wind the ink ribbon 62. When the phase generated by the photo sensor 86 goes from "0" to "1", the initial position of the transparent dividing section 74 is detected. When the phase generated by the photo sensor 86 goes from "1" to "0" again, the initial position of the cyan dye frame 70 is detected. Then, start to print the dye on the cyan dye frame 70 onto the photo paper. Thereafter perform step 142 to search for the over coating dye frame 72.

Step 142:Search for the over coating dye frame 72. Because printing of the dye on the cyan dye frame 70 onto the photo paper has just finished, the photo sensor 86 must still be within the cyan dye frame 70. Continuously wind the ink ribbon 62. When the phase generated by the photo sensor 86 goes from "0" to "1", the initial position of the over coating dye frame 72 is detected. Then, start to print the dye on the over coating dye frame 72 onto the photo paper.

According to the above-mentioned steps, the ink ribbon positioning system 60 of the color printer 100 in the first embodiment of the present invention utilizes the two green light sources 82, 92 together with the photo sensors 86, 96 to sense the initial position of the ink ribbon 62. Then the phase and the conversion code of each part of the ink ribbon 62 are determined using a digital conversion manner. The initial position of the yellow dye frame 66 is discerned by utilizing the variation of the conversion codes (as mentioned above, finding where the conversion code changes from "1" to "3"). The yellow dye frame 66 serves as the initial position of the ink ribbon 62 for printing the dye onto the photo paper. Thereafter, the initial position of the magenta dye frame 68, the cyan dye frame 70, and the over coating dye frame 70 can be determined by utilizing the phase variations. In this manner, the color printer 100 according to the present invention can detect the position of the ink ribbon 62.

Figure 10:
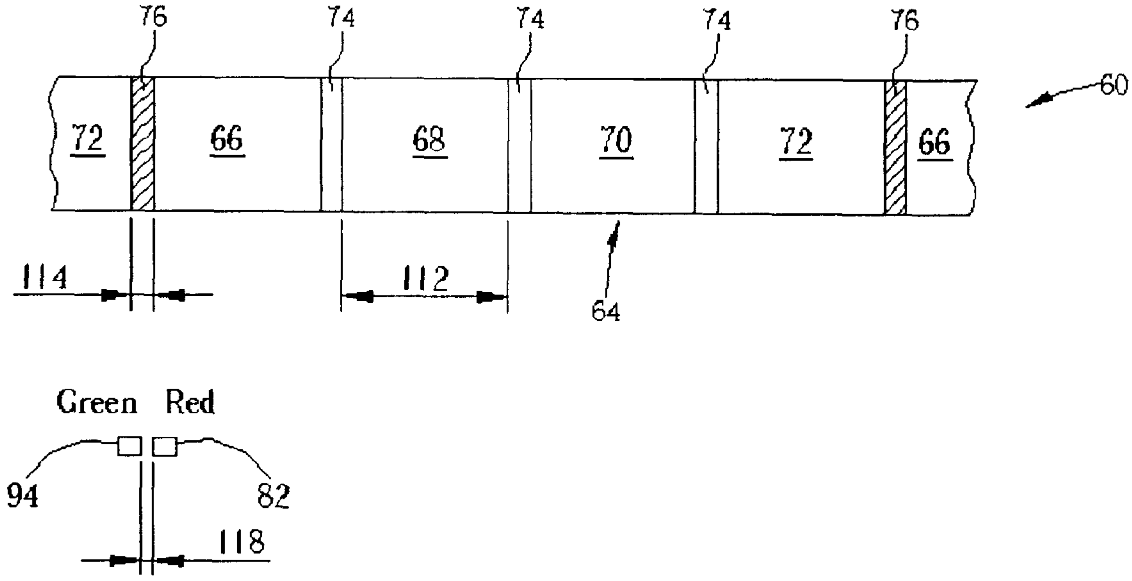
FIG. 10 is a perspective view of an ink ribbon positioning system of a color printer according to a second embodiment of the present invention.
Figure 11A:
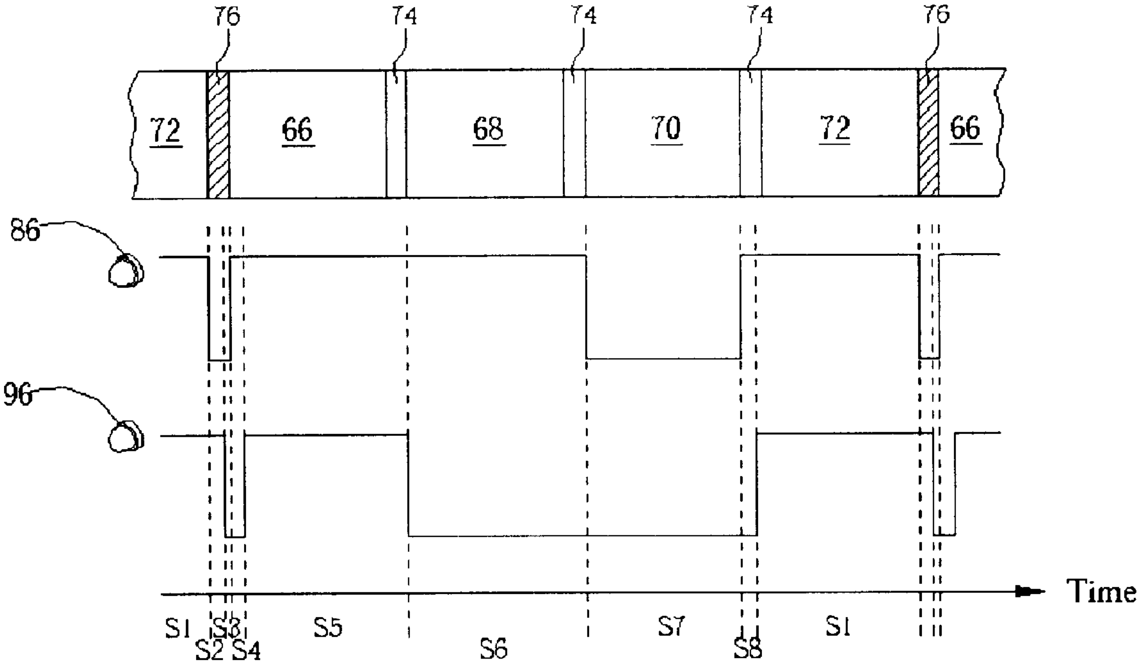
FIG. 11A is a time sequence diagram of phases generated by a photo sensor shown in FIG. 10.

Please refer to FIG. 10, FIG. 11A, and FIG. 11B. FIG. 10 is a perspective view of the ink ribbon positioning system 60 of the color printer 100 according to a second embodiment of the present invention. FIG. 11A is a time sequence diagram of the phase generated by the photo sensor shown in FIG. 10. FIG. 11B is a table contrasting the phase and the conversion code generated by the photo sensor shown in FIG. 11A. The ink ribbon 62 comprises theplurality of dye regions 64 sequentially arranged in the predetermined direction. Each of the dye regions 64 consists of four dye frames 66, 68, 70, 72 for carrying dye of yellow, magenta, cyan and over coating colors, and each of the dye frames 66, 68, 70, 72 has a substantially equal first length 112. The opaque dividing section 76 and the three transparent dividing sections 74 are positioned at the front end of each of the dye frames 66, 68, 70, 72, that allows the controller 90 to discern the initial position of each of the four dye frames 66, 68, 70, 72, and each dividing section has the substantially equal second length 114. The controller 90 controls the color printer 100, and the ribbon driving device 78 causes the ink ribbon 62 stored in the ribbon cartridge to roll in the predetermined direction. The thermal print head 102 transfers the dye of different colors stored in the dye frames 66, 68, 70, 72 onto the photo paper to form a desired pattern.

As shown in FIG. 10, the ink ribbon positioning system 60 comprises two optical detecting devices mounted adjacent to the ink ribbon 62 and arranged sequentially along the predetermined direction, and a distance between the two optical detecting devices is a third length 118. Unlike the first embodiment, the first length 112 is greater than the second length 114, and the third length 118 is less than the second length 114. Each of the optical detecting devices includes the first light source 82 and the second light source 92 installed at one side of the ink ribbon 62 for respectively emitting the light beam 84 of red color and the light beam of green color, and the first photo sensor 86 and the second photo sensor 96 installed at the opposite side of the ink ribbon 62 for detecting transmitted lights 84 and 94 emitted by the first light source 84 and the second light source 94. The transmitted lights 84 and 94 penetrate the ink ribbon 62, thereby generating corresponding position signals. At least one dye frame 66, 68, 70, 72 inside each of the dye regions 64 causes the first photo sensor 86 and the second photo sensor 96 to generate different output signals (i.e. phase).

As shown in FIG. 11A, when the controller 90 causes the ribbon driving device 78 to wind the ink ribbon 62 stored in the ink ribbon cartridge so as to cause the dye frames 66, 68, 70, 72 inside the dye region 64 to pass by the thermal print head 102 sequentially, the first photo sensor 86 and the second photo sensor 96 sense the dye region 64 of the ink ribbon 62, thereby generating two different phases. Therefore, eight state-to state variations S1, S2, S3, S4, S5, S6, S7, S8 are generated along a time axis when the first photo sensor 86 and the second photo sensor 96 sense dye frames of the dye region 64. The details are described as follows (please refer to FIG. 5, FIG. 6, FIG. 10, FIG. 11A and FIG. 11B):Step 150:Search for the yellow dye frame 66. Turn on the red light source 82, thegreen light sources 92 and the two photo sensors 86, 96, and wind the ink ribbon 62; Step 152:Search for the phase "11", it could be S1 or S5, and then wind the ink ribbon 62 continuously; Step 154:Search for the next state. If the phase is "01", it is S2, namely the initial position of the yellow dye frame 66 is detected (due to a distance between the thermal print head 102 and the first photo sensor 86). When the conversion code goes from "3" to "01", the color printer 100 can start to transfer the dye on the yellow dye frame 66 onto the photo paper, and then perform step 156 and search for the magenta dye frame 68. If the phase is "10", it is S6, and then step 152 is performed.

Step 156:Search for the magenta dye frame 68. Because printing of the dye on the yellow dye frame 66 onto the photo paper has just finished, the second photo sensor 96 must still be within the yellow dye frame 66. Continuously wind the ink ribbon 62. When the phase generated by the second photo sensor 96 goes from "1" to "0", the initial position of the magenta dye frame 68 is detected. Then, start to transfer the dye on the magenta dye frame 68 onto the photo paper. Thereafter perform step 158 to search for the cyan dye frame 70.

Step 158:Search for the cyan dye frame 70. Because printing of the dye on the magenta dye frame 68 onto the photo paper has just finished, the first photo sensor 86 must still be within the magenta dye frame 64. Continuously wind the ink ribbon 62. When the phase generated by the first photo sensor 86 goes from "1" to "0", the initial position of the transparent dividing section 74 is detected. When the phase generated by the first photo sensor 86 goes from "1" to "0" again, the initial position of the cyan dye frame 70 is detected. Then, start to print the dye on the cyan dye frame 70 onto the photo paper. Thereafter perform step 160 to search for the over coating dye frame 72.

Step 160:Search for the over coating dye frame 72. Because printing of the dye on the cyan dye frame 70 onto the photo paper has just finished, the first photo sensor 86 must still be within the cyan dye frame 70. Continuously wind the ink ribbon 62. When the phase generated by the first photo sensor 86 goes from "0" to "1", the initial position of the over coating dye frame 72 is detected. Then, start to print the dye on the over coating dye frame 72 onto the photo paper.

According to the above-mentioned steps, the ink ribbon positioning system 60 of the color printer 100 in the second embodiment of the present invention utilizes the red light source 82 and the green light source 92 together with the photo sensors 86, 96 to sense the initial position of the ink ribbon 62. Like the first embodiment, the phase and the conversion code of each part of the ink ribbon 62 are determined by using a digital conversion manner. The initial position of the yellow dye frame 66 is discerned by utilizing the variation of the conversion codes (as mentioned above, finding the conversion code goes from "1" to "3"). The yellow dye frame 66 serves as the initial position of the ink ribbon 62 for printing the dye onto the photo paper. Thereafter, the initial position of the magenta dye frame 68, the cyan dye frame 70, and the over coating dye frame 70 can be discerned by utilizing the phase variations. In this manner, the color printer 100 according to the present invention can detect the position of the ink ribbon 62.

The four dye frames are used as an example in the embodiments of the present. invention. Actually, three dye frames without the over coating dye frame can be used in the present invention to explain the ink ribbon positioning system. In addition, the present invention utilizes the two light sources of green light beams with the two photo sensors, or uses light sources of red and green light beams with the two photo sensors, to generate the phases and the conversion codes of each part of the ink ribbon. However, in the present invention the first light source and the second light source can also be other colors such as (green, red), (cyan, red), (cyan, green) etc., or be the same color such as (cyan, cyan) etc. Any combination of colors can be used in order to generate different phases and states. Further, the initial position of the ink ribbon can be discerned according to the two predetermined phases generated by the first photo sensor and the second photo sensor or the two predetermined conversion codes. In addition, in the present invention, the photo sensors and the light sources are installed at opposite sides of the ink ribbon. In fact, the photo sensors and the light sources can be installed at the same side of the ink ribbon if a reflector is installed at the opposite side of the ink ribbon for reflecting the light beams back to the photo sensors for generating the phases.

Compared with the conventional ink ribbon positioning system of the color printer, the ink ribbon positioning system 60 of the present invention discerns the initial position of the dye frame of the ink ribbon according to the different phase-to-phase variations generated by the light sources and the photo sensors of the optical detecting devices without the need for any identification devices, parts for measuring voltage variations, or particular barcodes to identify the ink ribbon, resulting in decreased costs.

Those skilled in the art will readily observe that numerous modification and alterations of the device may be made while retaining the teachings of the invention. Accordingly, the above disclosure should be construed as a limited only by the metes and bounds of the appended claims.

What is claimed is:

1. A color printer comprising:

an ink ribbon capable of moving in a predetermined direction, comprising a plurality of dye regions sequentially arranged in said predetermined direction on said ink ribbon, and each of said dye regions comprising a plurality of dye frames for carrying dye of different colors;

a print head for transferring said dye of different colors stored in said dye frames onto an object to form a desired pattern;

a ribbon driving device for causing said ink ribbon to move in said predetermined direction;

a plurality of optical detecting devices mounted adjacent to said ink ribbon and arranged sequentially along said predetermined direction, wherein at least two output signals are detected when each of said optical detecting devices senses a dye frame, and wherein each said output signal is defined as a phase; and a controller for controlling said color printer;

wherein position of said ink ribbon is discerned by said controller according to said phase and phase-to-phase variation recorded by said optical detecting devices when said controller commands said ribbon driving device to move said ink ribbon.

2. The color printer of claim 1, wherein said color printer comprises only two optical detecting devices and each of said optical detecting devices generates only two different output signals when said optical detecting device senses a dye frame of said dye region.

3. The color printer of claim 1, wherein each of said optical detecting devices includes a light source and a photo sensor for detecting a transmitted light which is emitted from said light source and penetrates said ink ribbon thereby generating said output signals.

4. The color printer of claim 2, wherein each of said dye regions includes four dye frames, and adjacent to each of said four dye frame is disposed a dividing section that allows said controller to discern an initial position of each of said four dye frames.

5. The color printer of claim 4, wherein said four dye frames comprise a yellow dye frame, a magenta dye frame, a cyan dye frame, and an over coating dye frame.

6. The color printer of claim 5, wherein adjacent to said yellow dye frame, magenta dye frame, cyan dye frame, and over coating dye frame are disposed, respectively, an opaque dividing section, a first transparent dividing section, a second transparent dividing section, and a third transparent dividing section.

7. The color printer of claim 3, wherein at least two of said optical detecting devices have light sources emitting a light beam of a predetermined color.

8. The color printer of claim 4, wherein each of said dye frames has a substantially equal first length, said dividing section has a second length and a distance between two said optical detecting devices is a third length where said first length is greater than said third length, and said third length is greater than said second length.

9. The color printer of claim 3, wherein said plurality of optical sensing devices comprises at least two optical sensing devices having light sources emitting light beams of different colors, and at least one of said dye frames in each of said dye regions produces said output signals when being detected by said two optical sensing devices.

10. The color printer of claim 4, wherein each of said dye frames has a substantially equal first length, said dividing section has a second length and a distance between two said optical detecting devices is a third length where said first length is greater than said second length, and said second length is greater than said third length.

11. The color printer of claim 1 further comprising a ribbon cartridge for storing said ink ribbon, and said ribbon driving device causes said ink ribbon stored in said ribbon cartridge to roll in said predetermined direction.

12. The color printer of claim 1, wherein said color printer is a photo printer.

* * * * *